March 20, 1934.  M. W. ZANDER  1,951,384
AIR CLEANER
Filed Feb. 25, 1932   2 Sheets-Sheet 1
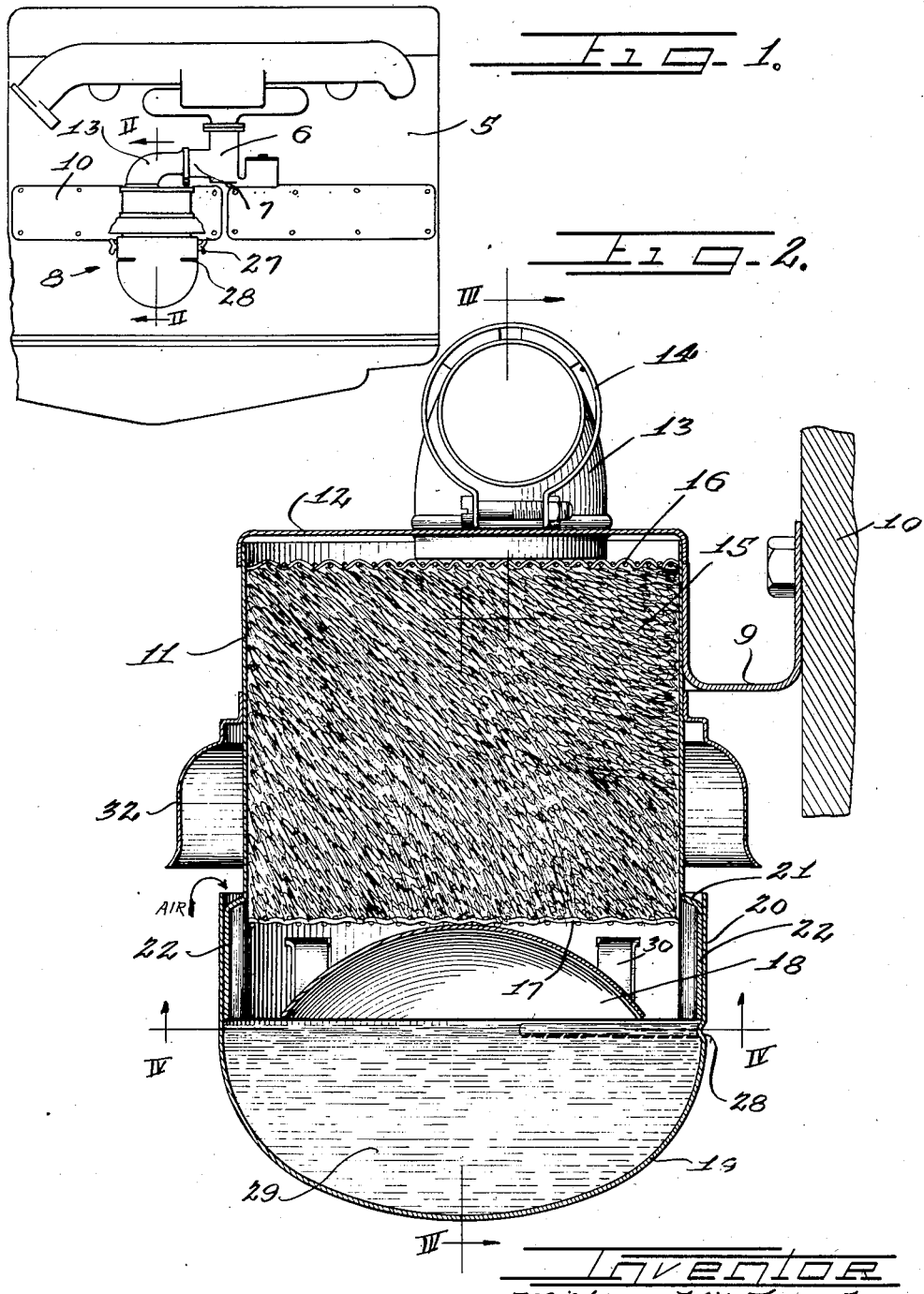
Inventor
Milton W. Zander
by Charles W. Hills
Attys.

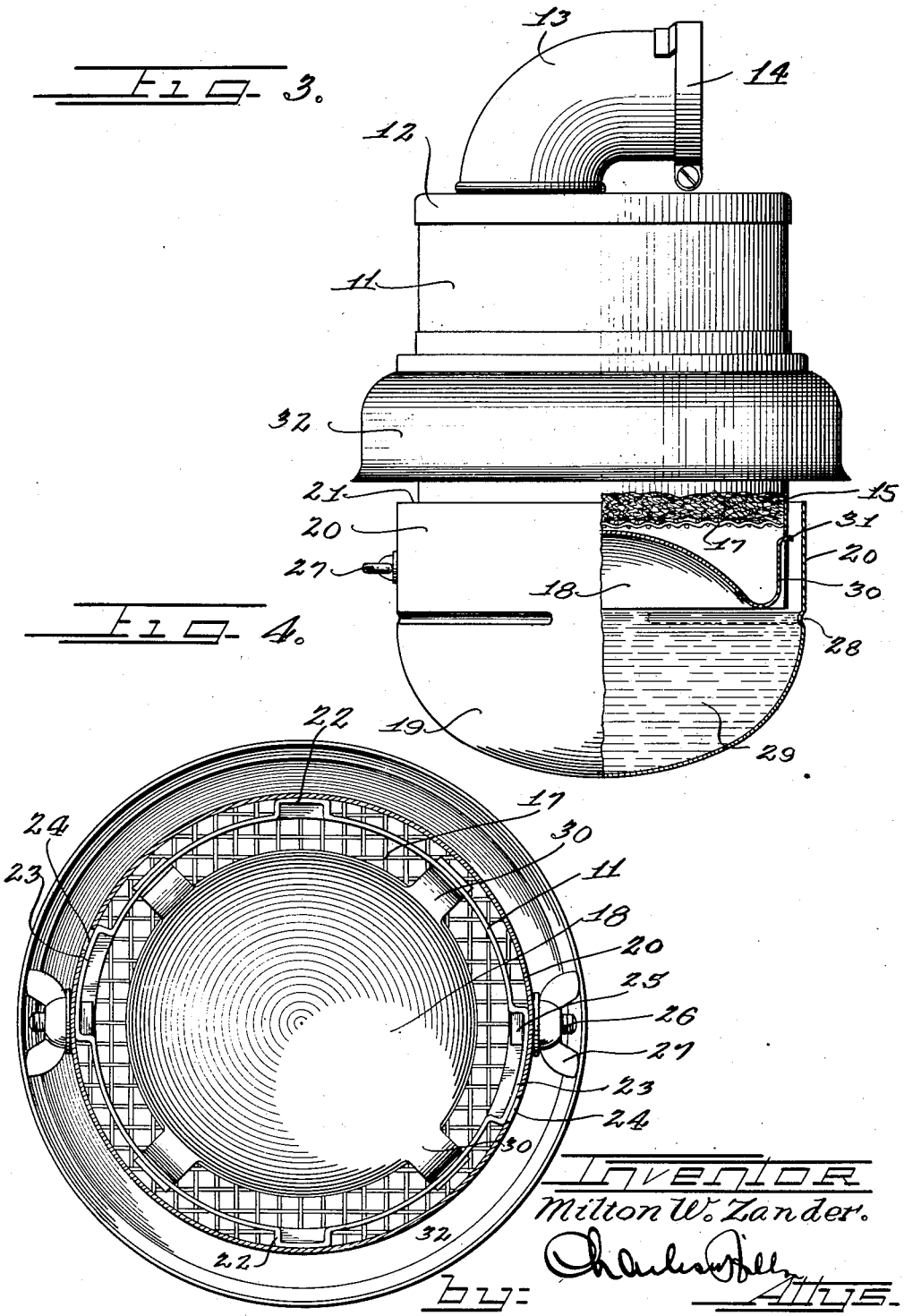

Patented Mar. 20, 1934

1,951,384

UNITED STATES PATENT OFFICE 1,951,384

AIR CLEANER

Milton W. Zander, Chicago, Ill., assignor of twenty-five per cent to A. M. Lichty, twenty-five per cent to B. Chaffey Shepherd, ten per cent to Ira H. Van Cleave, and five per cent to Joseph A. Allard, Jr.

Application February 25, 1932, Serial No. 595,119

9 Claims. (Cl. 183—10)

This invention relates to improvements in air cleaners of the type wherein the air is initially washed by a liquid and subsequently passed through a filtering medium, the cleaner having many and various uses as will be apparent to one skilled in the art including its use in connection with internal combustion engines, air compressors, braking mechanisms, and in practically any machinery requiring a supply of air for its operation.

It is now well known that the most efficient air cleaner for internal combustion engines is that type of air cleaner which first thoroughly mixes the air with a liquid, preferably an oil, such as crank case oil for example, and then filters the air to remove entrained oil and finer particles of foreign substances therefrom. In many cases, the filtering mass or medium is impregnated with oil or whatever liquid is used by the action of the air passing through the cleaner. Although the filter mass or medium is impregnated with the cleansing liquid, this mass or medium is, nevertheless, preferably of sufficient quantity to also effectively remove entrained liquid from the air passing therethrough so that when the air leaves the cleaning device it preferably does not carry entrained moisture therein, and is free from non-gaseous impurities.

In the past, difficulty has been experienced in providing cleaners of this type, having an efficiency under normal operating conditions in excess of 95%, sufficiently economically to make practical the installation of the cleaners on practically all types of automotive vehicles. Another difficulty experienced in the past and which has not been heretofore overcome is the manufacture of cleaners of this type in a sufficiently small size for installation under the hood of passenger automobiles, the use of this type of cleaner heretofore being in the main restricted insofar as automotive vehicles are concerned to trucks, tractors, busses and the like, to the elimination at least to an alarming and undesirable extent, of ordinary passenger automobiles.

Of course, there is a great demand for a cleaner of this character which may be used on practically any type of automobile, and to satisfy this demand the present invention has been developed.

Accordingly, it is an object of this invention to provide an air cleaner of the combined liquid washing and filtering type with an efficiency in excess of 95% and which may be manufactured sufficiently economically to warrant the feasibility of installation upon substantially any make or size of automobile.

It is also an object of this invention to provide an air cleaner of the character set forth herein of a reduced size, whereby the cleaner may be readily mounted beneath the hood of an automobile or in places where space is similarly limited.

A further object of this invention is the provision of an air cleaner of the character described wherein all internal parts are readily removable for cleansing or replacement.

Still another object of this invention is an air cleaner of readily removable parts, whereby after a period of predetermined usage, it is not necessary for the user to substitute an entirely new cleaner but merely to purchase a standard part and substitute that part for a like part that has passed beyond its period of usefulness.

Still another object of this invention is the provision of an air cleaner embodying a baffle member of a peculiar shape and configuration which enhances the thorough mixing of incoming air with whatever liquid is contained in the cleaning device.

It is also an object of this invention to provide an air cleaner with substantially an annular inlet to conserve space and at the same time provide an inlet of more than sufficient size, together with means for preventing the dropping or otherwise accidental entry into the inlet of foreign particles of the type not carried by air.

While some of the more salient features, characteristics and advantages of a device embodying this invention have been above pointed out, others will become apparent from the following disclosure.

The invention includes these and other features of construction and combinations of parts hereinafter described and shown in a preferred form in the drawings, as more particularly indicated by the claims.

On the drawings:

Figure 1 is a fragmentary elevational view showing an internal combustion engine of a well known type equipped with an air cleaning device embodying principles of the present invention.

Figure 2 is an enlarged fragmentary vertical sectional view through the device and a portion of the engine taken substantially as indicated by the line II—II of Figure 1, with the elbow outlet shown in elevation.

Figure 3 is a part elevational, part sectional view of the structure shown in Figure 2 as seen at a different angle, substantially as indicated by the lower portion of the staggered line III—III of Figure 2.

Figure 4 is an enlarged bottom plan sectional view through the device taken substantially as indicated by the line IV—IV of Figure 2.

As shown on the drawings:

In the illustrated embodiment of the present invention, there is seen an internal combustion engine 5 of any desirable type equipped with a suitable carburetor 6, the air intake 7 of the carburetor being attached, in a manner later to be described, to an air cleaner generally indicated by reference numeral 8, embodying principles of this invention. For the purpose of stability and to avoid suspending too much weight upon the carburetor intake 7, the air cleaner is provided with a bracket 9 (Figure 2), suitably apertured for the passage of one or more of the bolts by which the valve covers 10 are secured to the engine block. Of course, this is merely one desirable way of mounting the device, it being understood that the cleaner may be provided with any suitable form of brackets or other similar device which is connected to any desirable part of the engine block or other suitable carrier.

The cleaning device itself comprises an upper casing section 11 having a cover 12 which is secured to the section 11 by brazing, spot-welding or in any similar manner. This cover 12 has an offset aperture therein through which the lower end of an elbow 13 extends, the elbow being firmly secured to the cover and also provided at its outer end with an annular resilient clamp 14 by means of which a telescopic engagement between the elbow and carburetor intake 7 is maintained. Of course, the elbow forms the outlet of the cleaning device through which clean air enters the carburetor. The bracket 9 is secured at any desired point to the casing section 11.

Contained in the upper section 11 is a mass of filtering material 15, preferably compressed wavy wire, which is held in position between an upper screen 16 in abutment with the inner end of the elbow 13 and a lower similar screen 17 resting upon the top of a dome-shaped baffle plate 18. The screens 16 and 17 are of preferably rather wide mesh, and of reasonably stiff material, their main function being to hold the filter mass 15 in proper position, without affording any restriction to the flow of air.

The casing also comprises a lower cup-shaped section 19 which in its upper portion is of larger cross sectional area than the section 11. The lower section 19 is also provided with an upper substantially vertical portion 20 for telescopic engagement with the upper section 11. When the two sections are so engaged, due to the variance in sizes therebetween, a substantially annular inlet 21 is provided through which air to be cleaned may enter the casing. The continuity of the annular inlet 21 is only broken by a pair of opposed projections 22 formed integrally from the wall of the section 11, and by a pair of opposed projections 23 similar to the projections 22 and similarly formed. The projections 23, however, are substantially twice as wide as the projections 22 in order to completely cover bayonet slots 24 in the upper portion 20 of the section 19. Obviously, the projections 22 and 23 provide the necessary intimate engagement for the telescopic association between the two casing sections.

Within each of the projections 23 is a nut 25 engaged with a bolt 26 extending through the projections. Also engaged with the bolts is a wing nut 27, there being a suitable washer disposed between the wing nut 27 and the adjacent casing surface. To attach the section 19, it is simply necessary to slide the vertical portions of the bayonet slots over the respective bolts 26 between the projections 23 and the wing or thumb nut 27, then rotate the section 19 sufficient to engage the lower portions of the bayonet slots over the bolt and tighten the wing or thumb nut to securely join the casing sections. Immediately below the wing nut 27, the section 19 is provided with an inward bead 28 against which the lower edges of the projections 22 and 23 of the section 11 abut.

The dome-shaped baffle plate 18 terminates just above the beads 28, and these beads also define the proper liquid level for the liquid 29 contained in the section 19 while the device is in use. This liquid is preferably an oil, and used crank case oil from the engine to which the cleaner is connected functions entirely satisfactorily. The baffle 18 is provided with a plurality of upwardly extending lugs 30 at spaced points, each lug having an outwardly turned tip 31 (Figure 3) which is engageable through a suitable slot in the wall of the section 11. Of course, the lugs 30 are resilient so that they can be sprung inwardly until the tips 31 are withdrawn from the respective apertures and the baffle plate may be thus easily removed. With the removal of the baffle plate, it is a simple expedient to remove both of the screens 17 and 16 together with the mass of filtering material 15 therebetween and any one of these parts may be readily replaced and cleansed, or a new part substituted for that which has outlived its usefulness. It will be at once apparent, therefore, that the cleaner can be standardized so that if any part becomes defective, it is a simple expedient to buy that particular part and substitute it for the worn part.

In most cases of installation, the cleaner will be mounted vertically as shown clearly in Figure 1, and when the cleaner is in this position grease, thick oil, and various other foreign substances too heavy to be carried in incoming air might drop into the air inlet 21 were it not for a suitable hood 32 spot-welded or otherwise attached to the casing section 11 above the inlet.

In operation, the present invention is exceedingly simple and very highly efficient. Because of the suction developed in the internal combustion engine 5, air is drawn in through the inlet 21, the air traveling downwardly between the casing section 11 and the vertical wall 20 of the section 19. The air cannot assume an upward direction towards the outlet elbow 13 without first mixing with the oil or other liquid 29. The liquid 29 is forced upwardly adjacent the central portion of the cleaner against the baffle 18 by the action of the incoming air, and this disturbance of the liquid and the spraying action produced by its contact with the baffle causes a thorough mixing of the air and oil resulting in the removal of most of the impurities carried by the incoming air. After being thoroughly washed by the liquid, the air escapes upwardly between the boundary of the baffle 18 and the casing section wall 11 carrying an ample quantity of liquid with it to sufficiently impregnate the filter mass 15. During the passage of the air through the filter mass, substantially all of the remaining impurities are extracted from the air by the impregnated filter mass as is also all of the entrained moisture carried by the air, so that the air leaves the cleaner in excess of 95% pure and substantially dry.

It will be noted that the present invention may be made without departing from the efficiency thereof, in a size sufficiently small to enable the cleaner to be easily mounted under the hood of practically any automobile. It will also be noted that the cleaner is formed of relatively standardized parts, and may be very economically manufactured and installed. One of the main reasons why there can be such economy in cost and size of this invention lies in the fact that the air is caused to reverse its direction several times while in contact or while mixed with the cleansing liquid. For example, most of the air will pass downwardly into the liquid, upwardly with and in the liquid on the inside of the baffle 18, and then downwardly again while still mixed with the liquid to find its escape around the edges of the baffle.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. In an air cleaner, a casing having an annular inlet and an outlet spaced from said inlet, said casing having a liquid sump therein, a dome shaped baffle centrally disposed in said casing above said sump and sufficiently close to the liquid level for incoming air to spray liquid over said baffle, and means between said baffle and said outlet for removing entrained liquid from incoming air.

2. In an air cleaner, a casing having an annular inlet and an outlet spaced therefrom, a dome-shaped baffle centrally disposed in said casing, filtering means above said baffle, and said casing having a liquid sump below said baffle and in the path of air entering said annular inlet, whereby liquid from said sump is splashed against said baffle and thoroughly mixed with incoming air, entrained liquid being removed from the air by said filter means.

3. In an air cleaner, a casing including an upper section having an outlet for cleaned air, a dome-shaped baffle of a less size than said casing resiliently and removably centrally engaged therein, filter means supported by said baffle, and a lower section for containing a liquid removably attached to said upper section and of sufficient larger size to provide an annular air inlet.

4. In an air cleaner, a casing having an outlet for cleaned air and an inlet passage for air to be cleaned leading in a direction away from said outlet, said casing having a liquid sump with the liquid level adjacent the inner part of said inlet passage, and baffle means disposed between said sump and outlet and formed to cause at least another reversal of direction of the air while the air is mixed with liquid from said sump.

5. In an air cleaner, a casing having an inlet passage and an outlet spaced therefrom, said casing having a liquid sump, and a baffle in said casing adjacent said sump, the parts being arranged to cause a plurality of reversals of direction of the air before the air is free from the sump liquid.

6. In an air cleaner, a casing having a substantially annular inlet and an outlet spaced from said inlet, said casing having a liquid sump therein with the liquid level adjacent said inlet, and an unobstructed baffle in said casing adjacent the liquid level in advance of the outlet and of a size to block direct passage of air to said outlet, whereby air will spray liquid over said baffle and become mixed with said liquid, said air of necessity changing direction to reach said outlet by passing around the edge of said baffle.

7. In an air cleaner, a casing having a substantially annular inlet and an outlet spaced from said inlet, said casing having a liquid sump therein with the liquid level adjacent said inlet, and an unobstructed dome-shaped baffle disposed above said liquid level and blocking the direct passage of air to said outlet, said baffle being of less cross-sectional area than said casing and providing a mixing space for liquid and air and causing a change in direction of said air to reach said outlet after being cleansed by said liquid.

8. In an air cleaner, a casing having an inlet and also an outlet spaced from said inlet, said casing having a liquid sump in the path of air entering through said inlet, a baffle of extensive surface area positioned in said casing in advance of said outlet and sufficiently closely adjacent to the liquid level in said sump that air entering though said inlet in operation must cause liquid from said sump to be sprayed against the extensive surface area of said baffle and to become commingled with said air, and filter means between said baffle and said outlet in the path of air traveling through said casing to remove entrained liquid from outgoing air.

9. In an air cleaner, a casing having an inlet and an outlet spaced from said inlet, the lower portion of said casing being removable from the upper portion and forming a liquid sump in the path of air entering through said inlet, a baffle in said casing in advance of said outlet and closely adjacent the liquid level in said sump, said baffle being of such size and so located as to substantially block a direct flow of air from said inlet to said outlet and to cause liquid from said sump to be sprayed by the force of the air flow against said baffle and to become commingled with the air, means holding said baffle removably in position, and filter means to remove entrained moisture from outgoing air held in position in advance of said outlet by said baffle and removable upon the removal of said baffle.

MILTON W. ZANDER.